United States Patent [19]

Diepolder et al.

[11] Patent Number: 5,733,050
[45] Date of Patent: Mar. 31, 1998

[54] BEARING ARRANGEMENT FOR ROTATING MEMBERS

[75] Inventors: Wolfgang Diepolder, Freising; Bernhard Woehrl, Gauting, both of Germany

[73] Assignee: MTU Motoren- und Turbinen-Union Muenchen GmbH, Munich, Germany

[21] Appl. No.: 802,545

[22] Filed: Feb. 18, 1997

[30] Foreign Application Priority Data

Feb. 17, 1996 [DE] Germany ............... 196 05 971.2

[51] Int. Cl.⁶ .................... F16C 41/00; F16C 39/04
[52] U.S. Cl. .................... 384/624; 384/99
[58] Field of Search ............... 384/99, 510, 535, 384/559, 581, 624, 627

[56] References Cited

U.S. PATENT DOCUMENTS

| | | | |
|---|---|---|---|
| 3,395,857 | 8/1968 | Petrie et al. | 415/9 |
| 3,901,557 | 8/1975 | Daniels | 384/627 X |
| 4,084,861 | 4/1978 | Greenberg et al. | 384/99 |
| 4,687,346 | 8/1987 | Suciu | 384/99 |

FOREIGN PATENT DOCUMENTS

| | | |
|---|---|---|
| 21 57 514 | 8/1972 | Germany . |
| 29 41 910 | 4/1980 | Germany . |
| 32 43 459 | 7/1983 | Germany . |
| 44 29 640 | 4/1995 | Germany . |

*Primary Examiner*—Thomas R. Hannon
*Attorney, Agent, or Firm*—Evenson, McKeown, Edwards & Lenahan, P.L.L.C.

[57] ABSTRACT

A bearing arrangement is provided for rotors of jet engines with a bearing, which is mounted on a rotor carrier via a bearing carrier. In the event of failure, for example if the blade of a compressor rotor breaks, damage to or destruction of the rotor carrier or of the housing should be prevented by the fact that a breaking piece, which breaks under a defined load, is arranged concentrically between the rotor carrier and the bearing carrier. In this way, the transfer of extreme radial loads to the rotor carrier or to the rotor housing enclosing it is largely avoided, provided that the rotating member has not yet come to a standstill. The bearing arrangement is particularly of interest for turbo jet engines for aeroplanes, where for example, in the case of damage to a fan-rotor blade, the effect of a destructive force of a rotor running at high speed on neighboring housing areas can be reduced.

14 Claims, 4 Drawing Sheets

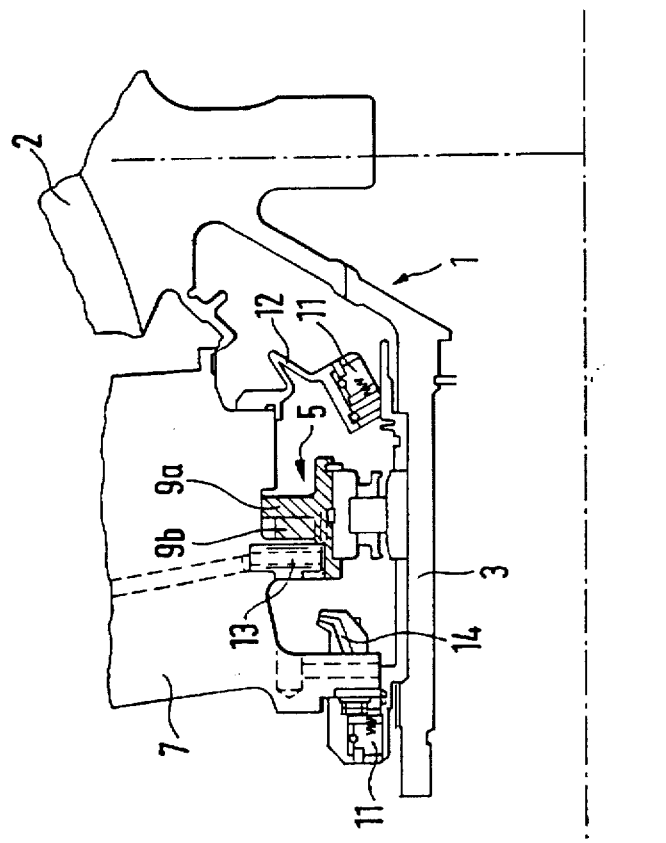
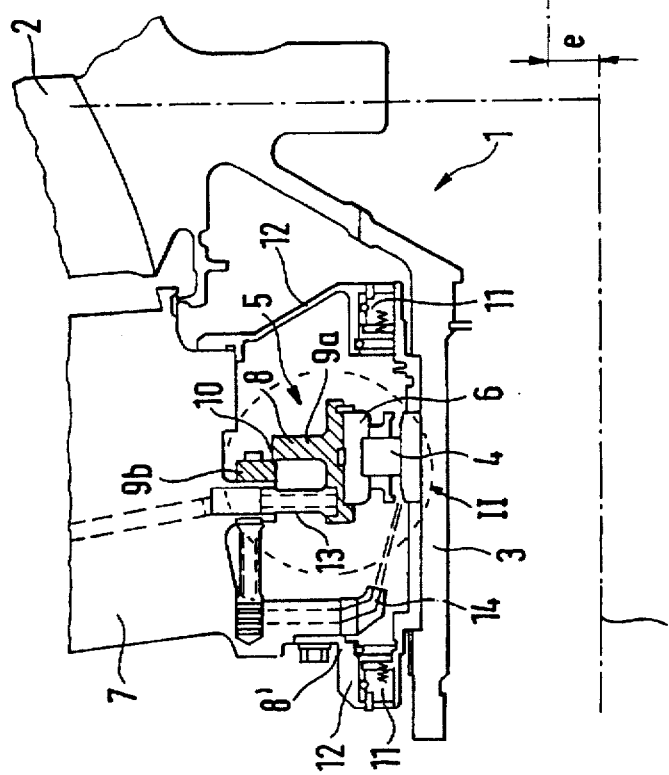

BEARING ARRANGEMENT FOR ROTATING MEMBERS

BACKGROUND AND SUMMARY OF THE INVENTION

The invention relates to a bearing arrangement for rotating members, particularly for rotors of jet engines and, more particularly, to a bearing arrangement for the resilient mounting of rotors, particularly for jet engines, with a bearing which is fitted on a rotor carrier via a bearing carrier and a spring cage arranged concentrically to the bearing, the spring cage having several flexible rods concentrically surrounding the bearing carrier.

The bearing of a rotor of a jet engine, which with a roller bearing, for example, consists of a fixed and a loose bearing, is designed with regard to stability for dynamic and static operational loads. If during operation unforeseen high stresses on the rotor bearing occur, due to imbalance for example, then the forces arising are transferred via the bearings into the rotor carrier, e.g. into the housing. The forces arising here can then lead to destruction of the housing. With turbo jet engines for aeroplanes, for example, such extreme loading conditions can be caused by a breakage of the blade in the compressor or fan area. The broken-off rotor blade collides with the following blades and thus leads to a drastic increase in the bearing forces which load the housing or the engine suspension via the bearing carrier.

In view of the above, there is therefore needed a bearing arrangement of this type for rotating members, in which, in the event of failure, damage to or destruction of the rotor carrier or the housing is largely excluded.

These needs are met according to the present invention by a bearing arrangement for the resilient mounting of rotors, particularly for jet engines, with a bearing which is fitted on a rotor carrier via a bearing carrier and a spring cage arranged concentrically to the bearing, the spring cage having several flexible rods concentrically surrounding the bearing carrier. A breaking piece is provided, arranged concentrically between the rotor carrier and the bearing carrier. The breaking piece breaks under a certain load and has elements aligned in a spoke-like manner. The rods and elements are arranged alternately in the circumferential direction.

The invention has the advantage that, as a result of the rotor-concentric arrangement of a breaking piece between the rotor carrier and the bearing carrier, in the case of damage, the rotating member, by breakage of the breaking piece, receives a radial degree of freedom that goes significantly beyond the conventional radial clearance of a bearing. In this way, the transfer of extreme radial loads, caused by loads in the case of damage or due to rotor-dynamic forces on the rotor carrier or on the adjoining rotor housing, is largely avoided, provided the rotating member has not yet come to a standstill.

Other objects, advantages and novel features of the present invention will become apparent from the following detailed description of the invention when considered in conjunction with the accompanying drawings.

BRIEF DESCRIPTION OF THE DRAWINGS

FIG. 1a is a partial axial section view of a bearing arrangement in the undeformed condition;

FIG. 1b is an axial section view according to FIG. 1a in the deformed condition of the bearing arrangement and eccentric position of the rotating member;

FIG. 2 is a partial enlargement view in the area of the breaking piece in accordance with FIG. 1a;

DETAILED DESCRIPTION OF THE DRAWINGS

Figure 2:
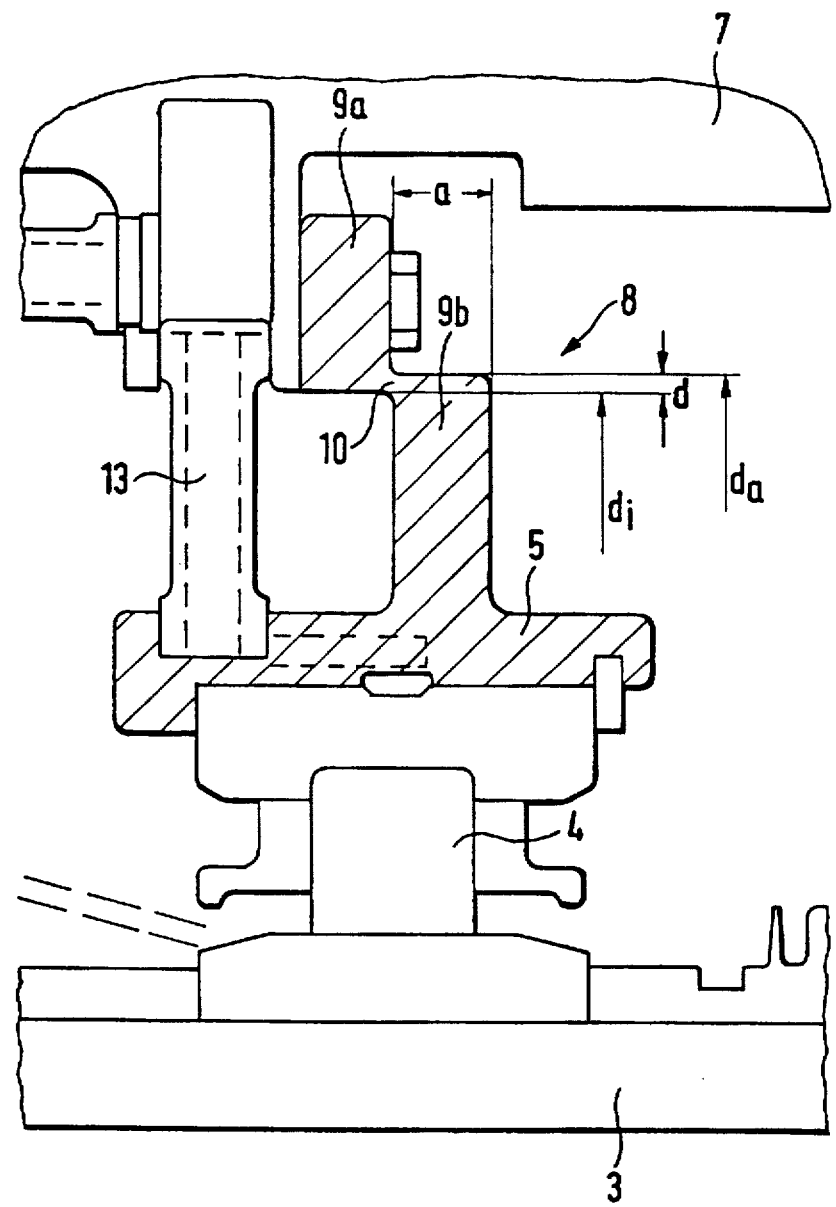

FIG. 1a shows the bearing arrangement on a rotor 1 of a jet engine which is not shown in further detail. The rotor 1 drives a fan stage 2. The rotor 1 has, besides the bladed fan stage 2, an adjoining pivot pin 3, on which sits a rolling bearing 4 of the roller type. In this example of a loose bearing, the bearing 4 only receives radial loads of the rotor 1, whilst the accompanying fixed bearing is not shown. The bearing 4 is in turn fixed with its outer bearing ring 6 in a concentric bearing carrier 5. The bearing carrier 5 is flanged onto a star-shaped rotor carrier 7, so that the radial forces of the rotor 1 resulting from dynamic and static operational loads can be taken up by the rotor carrier 7.

The bearing carrier 5 is provided radially outwardly in the transition region to the rotor carrier 7 with a ring-shaped breaking piece 8 concentric to the bearing 4. This in turn has two ring-shaped elements 9a, b axially offset and concentric with respect to each other, the axial offset a, as shown in FIG. 2, being afforded by a short, annular web 10 having a small radial thickness d and thus connecting two ring-shaped elements 9a, b of the breaking piece 8.

The wall thickness d of the web 10 is of such a dimension that upon exceeding a defined radial load it breaks and thus the rotor 1 is given a radial escape space, as can be seen in FIG. 1b. The radially inner element 9a can now shift radially outward with respect to the radially outer element 9b because of the axial displacement a. The harmful load transfer to the rotor carrier 7 is stopped by the increased radial clearance of the rotor 1, so that its destruction or damage can be avoided. The web 10, forming a breaking point of the breaking piece 8, is placed in the course of the line of effect of the radial bearing force, so that a plane of shear with a uniaxial state of stress can form. The diameters $d_i$ and $d_a$ of the radially outer and radially inner elements 9a, be respectively forming the web 10 can be produced very precisely, so that the force producing the break can be given a very tight tolerance.

The bearing carrier 5 manufactured in one piece with the breaking piece 8 is screwed to the rotor carrier 7, so that the parts can be disassembled.

On both sides of the rolling bearing 4 are mounted radial sealing rings 11 forming a seal against oil leakage. These are, in turn, held respectively by a seal carrier 12 on the rotor carrier 7 and, for radial deviation in the case of breakage of the rotor 1, are deformable or are constructed with a breaking piece.

For supplying the rolling bearing 4 with lubricating and cooling oil, a radially displaceable oil supply 13 is provided between the rotor carrier 7 and the bearing carrier 5, so as not to obstruct the radial movement of the rotor 1. If a radial deviation of the rotor 1 occurs, then the oil injection nozzles 14 extending into the bearing space hit the rotor 1 and are broken off or bent away (FIG. 1b).

Figure 3B:
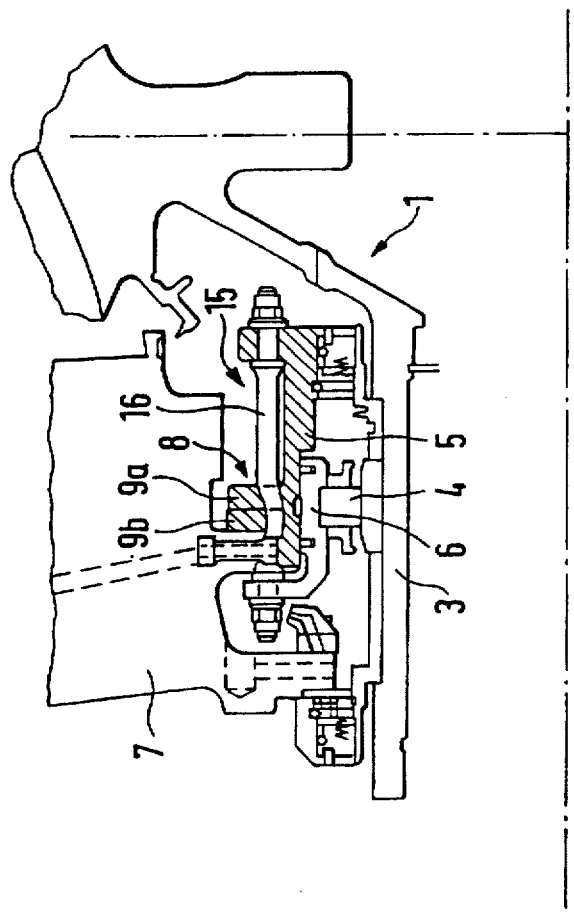
FIG. 3b is an axial section view according to FIG. 3a in the deformed condition of the bearing arrangement and eccentric position of the rotating member.
Figure 3A:
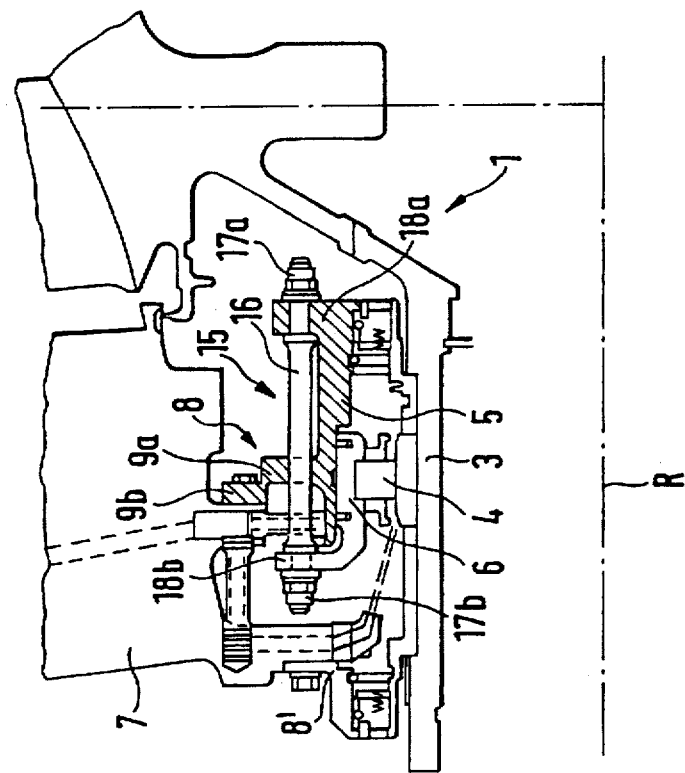
FIG. 3a is a partial axial section view of a bearing arrangement with an elastic spring cage.

FIGS. 3a and 3b show the bearing arrangement with a spring cage 15 (a so-called "squirrel cage") concentrically surrounding the bearing 4, which spring cage in cooperation with oil film damping between the outer bearing ring 6 and the cylindrical bearing carrier 5 resiliently holds the rotor 1 on the rotor carrier 7. For this purpose, several flexible rods 16, arranged parallel to the rotor axis R and concentrically surrounding the bearing carrier 5, are provided. These rods 16 are mounted with one end 17a on a flange 18 of the bearing carrier 5 and with their opposite end 17b on a flange 18b on the bearing ring 6, so that the bearing ring 6 can move resiliently in the radial direction with respect to the bearing carrier 5 within the range of the width of the rolled oil film and thus forms an elastic bearing with oil damping. In the region of the element 9a, the flange 18a with the bearing carrier 5 together in cross-section form a U-shaped casing. The spoke-shaped breaking piece 8 protrudes with its radially inner elements 9a between the rods 16 (FIG. 4a), so that the rods 16 alternate with the elements 9b in the circumferential direction. The inner elements 9a are integrally connected via the breaking points to the ring-shaped outer element 9b.

The bearing arrangement according to FIGS. 3a and 3b ensures a compact construction, in which in the bearing arrangement the spring cage 15 is integrated with the breaking piece 8.

With both bearing variations—with or without spring cage 1B (i.e., the "squirrel-cage")—the necessary radial escape space can be realized by appropriate construction in the housing region between the bearing carrier and the rotor carrier 5 and 7.

Figure 4A:
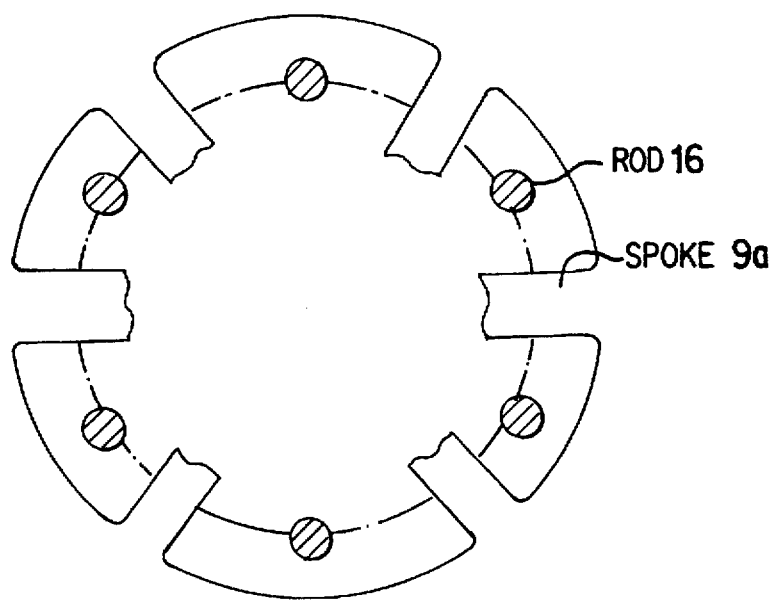
FIG. 4a is a schematic depiction of a first embodiment of a squirrel cage in accordance with FIGS. 3a and 3b.
Figure 4B:
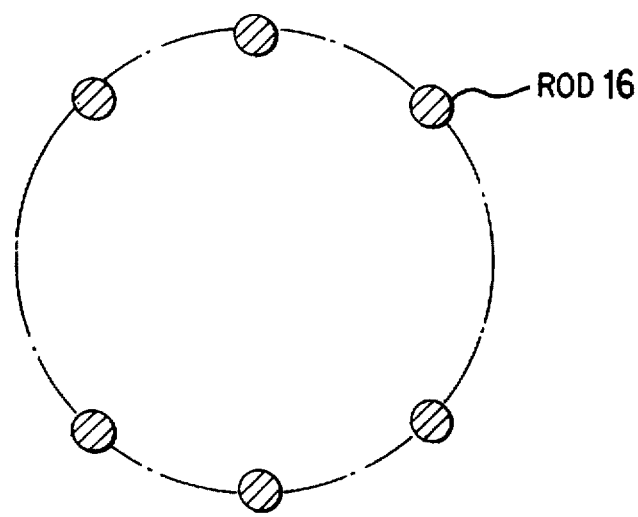
FIG. 4b is a schematic depiction of a second embodiment of a squirrel cage in accordance with FIGS. 3a and 3b.

Referring to FIGS. 4a and 4b, the squirrel cage has a rod arrangement typically having between 5 to 12 rods depending upon the demanded stiffness and available space. Normally, the rods 16 are regularly arranged over the circumference at equal angles. However, if necessary, other symmetrical arrangements over the circumference such as is shown in FIG. 4b can be used. Both FIGS. 4a and 4b illustrate a six-rod example, wherein the rods 16 in FIG. 4a are equally arranged over the circumference and the rods 16 in FIG. 4b have a symmetrical arrangement but with different angles at different sectors of the circumference.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A bearing arrangement for resiliently mounting a rotor of a jet engine, with a bearing which is fitted on a rotor carrier via a bearing carrier and a spring cage arranged concentrically with respect to the bearing, said spring cage having several flexible rods concentrically surrounding the bearing carrier, the bearing arrangement comprising:

a breaking piece arranged concentrically between the rotor carrier and the bearing carrier so as to break under a certain load, said breaking piece having elements aligned in a spoke-like manner; and wherein the flexible rods and the elements are arranged alternately in a circumferential direction of the bearing carrier.

2. The bearing arrangement according to claim 1, wherein the breaking piece comprises a radially outer element connected to the rotor carrier and a radially inner element connected to the bearing carrier, said elements being arranged concentrically to the rotor and having connection points between them, wherein at said connection points one or more annular or part-annular breaking points are provided.

3. The bearing arrangement according to claim 2, wherein said breaking points are formed at each of said radially outer and radially inner elements.

4. The bearing arrangement according to claim 2, wherein said breaking points are formed as thin-walled connection cross-sections.

5. The bearing arrangement according to claim 2, wherein at least one of said radially outer and radially inner elements are constructed as a flange.

6. The bearing arrangement according to claim 5, wherein said breaking points are formed as thin-walled connection cross-sections.

7. The bearing arrangement according to claim 1, wherein a breaking point is formed at each of said elements aligned in a spoke-like manner of said breaking piece.

8. The bearing arrangement according to claim 7, wherein said breaking points are formed as thin-walled connection cross-sections.

9. The bearing arrangement according to claim 1, wherein said breaking piece has two elements concentric to the rotor axis with an axial offset, said two elements being materially connected via a ring-shaped web having a small radial thickness.

10. The bearing arrangement according to claim 9, wherein a diameter to thickness ratio between said two elements and said ring-shaped web is greater than 10.

11. The bearing arrangement according to claim 1, wherein said breaking piece is releasably connected to at least one of the rotor carrier and the bearing carrier.

12. The bearing arrangement according to claim 1, wherein the bearing arrangement further comprises:

a seal arranged between the rotor carrier and a rotated component; and a seal carrier being mounted on the rotor carrier and being constructed, for purposes of a radial deflection, so as to be deformable or so as to have a separate breaking piece.

13. The bearing arrangement according to claim 1, further comprising a radially displaceable supply for lubricating the bearing, said supply being provided between the rotor carrier and the bearing carrier.

14. The bearing arrangement according to claim 1, wherein the elements of the breaking piece are aligned in a spoke-like manner between the bearing carrier and the rotor carrier, and further wherein the bearing carrier is connected with a radially outer bearing ring of the bearing via several resilient rods concentrically surrounding the bearing carrier, said rods and said elements being arranged alternately in a circumferential direction.

* * * * *